United States Patent

Heine et al.

[15] 3,657,088
[45] Apr. 18, 1972

[54] MOULDING AND COATING MASSES HARDENABLE BY UV IRRADIATION

[72] Inventors: Hans-Georg Heine; Karl Fuhr, both of Krefeld; Hans Rudolph, Krefeld-Bockum; Hermann Schnell, Krefeld-Uerdingen, all of Germany

[73] Assignee: Farbenfabriken Bayer Aktiengesellschaft, Leverkusen, Germany

[22] Filed: Dec. 17, 1969

[21] Appl. No.: 885,986

Related U.S. Application Data

[63] Continuation-in-part of Ser. No. 837,865, June 30, 1969, abandoned.

[52] U.S. Cl..................204/159.15, 117/93.31, 204/159.23, 204/159.24
[51] Int. Cl...........................................B01j 1/00, C08d 1/00
[58] Field of Search....................204/159.23, 159.15, 159.24

[56] References Cited

UNITED STATES PATENTS 3,330,659  7/1967  Wainer..............................204/159.23

Primary Examiner—Murray Tillman
Assistant Examiner—Richard B. Turer
Attorney—Connolly and Hutz

[57] ABSTRACT

The invention relates to compounds and mixtures of compounds polymerisable by UV-irradiation which contain α-substituted benzoins of the formula

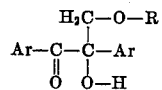

in which Ar stands for the unsubstituted phenyl radical or a phenyl radical substituted by lower alkyl having up to about 4 carbon atoms, methoxy, ethoxy or halogen, and R stands for hydrogen or acetyl, and the production of polymeric compounds thereof.

6 Claims, No Drawings

MOULDING AND COATING MASSES HARDENABLE BY UV IRRADIATION

This is a continuation-in-part of the application, Ser. No. 837,865, filed June 30, 1969, now abandoned, by Hans-Georg Heine, Karl Fuhr, Hans Rudolph and Hermann Schnell.

A great number of sulphur- and halogen-containing compounds, inter alia, have been mentioned in the literature as compounds which initiate and accelerate photopolymerisation. Also recommended are benzoin (U.S. Pat. No. 2,367,661) and some benzoin derivatives, such as certain α-substituted benzoins (U.S. Pat. No. 2,448,828; FP 1,450,589).

None of these compounds has been industrially accepted. The main causes for this failure are the insufficient reactivity and the unsatisfactory stability in dark storage of the polymerisable compounds which are admixed with these photo-sensitizers.

A group of α-substituted benzoins has now been found the mixtures of which with polymerisable compounds and mixtures thereof do not have the aforesaid disadvantages. These are excellently stable in dark storage and are rapidly polymerised under the influence of UV radiation.

The object of the invention therefore comprises compounds and mixtures of compounds polymerisable by UV irradiation containing α-substituted benzoins of the formula

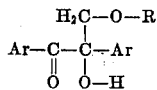

in which Ar stands for the unsubstituted phenyl radical or a phenyl radical substituted by lower alkyl having up to about 4 carbon atoms, methoxy, ethoxy or halogen, and R stands for hydrogen or acetyl.

Examples of such compounds are: α-hydroxymethyl-benzoin, α-hydroxymethyl-2,2'-dimethyl-, -diethyl-, -dipropyl-, -diisopropyl-, -dibutyl- and -diisobutyl-benzoin, α-hydromethyl-4,4'-dichloro- or -bromo-benzoin, α-hydroxymethyl-4,4'-dimethoxy- and -diethoxy-benzoin, α-acetoxymethyl-, -ethyl-, -propyl-, -isopro-pyl-, -butyl- and -isobutyl-benzoin. The easily obtainable α-hydroxymethyl-benzoin has proved particularly advantageous.

These compounds can be prepared in known manner by reacting the corresponding benzoins in aqueous alcohol with formaldehyde in the presence of alkalies [see A. KUZIN, B.68, 2,169 (1935)]. Esterification and etherification of the methylol group may follow, the photopolymerisable substrates themselves being used as reaction components, if desired.

The benzoins are expediently used in amounts of about 0.1 to about 5 per cent by weight, preferably about 0.5 to about 2.5 per cent by weight, either by themselves or in mixture with one another.

Suitable polymerisable compounds are all substances the carbon-carbon double bonds of which are activated, for example, by halogen atoms or carbonyl, cyanide, carboxy, ester, amide, ether or aryl groups as well as by carbon double or carbon triple bonds. Examples are: vinyl chloride, vinylidene chloride, vinyl methyl ketone, acrolein, acrylic acid methyl ester, methacrylic acid ethyl ester, acrylamide, methacrylamide, acrylonitrile, methacrylonitrile, chloroprene, vinyl ethyl ether, and styrene.

It is particularly advantageous to use moulding and coating masses consisting of mixtures of unsaturated polyesters and copolymerisable monomeric compounds.

The unsaturated polyesters comprise, as is usual, polycondensation products obtained from α, β-unsaturated dicarboxylic acids, such as maleic acid, fumaric acid, itaconic acid, metaconic acid and citraconic acid, with polyhydric alcohols, such as ethylene glycol, diethylene glycol, propane-, butane-, hexane-diol, trimethylolpropane and pentaerythritol. Part of the un-saturated acids may be replaced with saturated acids, for example, succinic acid, glutaric acid, adipic acid, phthalic acid, tetrachlorophthalic acid, hexachloro-endomethylene-tetrahydrophthalic acid and trimellitic acid. Other modifications can be achieved by the incorporation of monohydric alcohols, such as butanol, butyl glycol and tetrahydrofurfuryl alcohol, as well by the incorporation of monobasic acids, such as benzoic acid, oleic acid, linseed fatty acid and dehydrated castor oil fatty acid. It is also possible to use so-called air-drying moulding masses which contain, besides the radicals of α, β-unsaturated dicarboxylic acids, β, γ-unsaturated ether radicals, be it as constituents of the polyesters, e.g. according to the British Pat. Specification No. 810,222, be it as constituent of further components of the mixture, for example, according to German Pat. No. 1,067,210 and published German specification No. 1,081,228.

The copolymerisable monomeric compounds of said moulding and coating masses comprise the compounds which are usually applied in polyester technique and contain vinyl groups which may be substituted in the α-position or contain allyl groups which may be substituted in the β-position, for example: styrene, vinyltoluene, divinylbenzene, vinyl acetate, acrylic acid and its esters, acrylonitrile, methacrylic acid and the corresponding derivatives thereof, as well as allyl esters, such as allyl acetate, allyl acrylate, phthalic acid diallyl ester, triallyl phosphate and triallyl cyanurate.

The photopolymerisable compounds or mixtures may be stabilised by the addition of conventional inhibitors, such as p-benzoquinone, hydroquinone, 3-methyl-pyrocatechol or copper compounds, e.g. copper naphthenate, in the known amounts, and they may contain other conventional additives. If desired, polymerisation catalysts, e.g. peroxides, may be added in the amounts of about 0.1 to about 4 per cent by weight. Suitable peroxides are, for example, tert.-butyl perbenzoate, dicumyl peroxide, benzoyl peroxide and cyclohexanone peroxide. Furthermore, the addition of peroxides, particularly of methyl ethyl ketone peroxide, is recommended in the case where it is desirable to exclude slight discolourations of the cured products, such as may occur under the influence of light during irradiation, but possibly also during storage.

In combination with the use of ketone peroxides, there may be added metal compounds, such as cobalt, zirconium and vanadium naphthenate, or metal chelates, such as cobalt and zirconium acetyl-acetonate, in order to accelerate the curing. On the other hand, the storage stability of the masses is reduced when peroxides and metal accelerators are present at the same time. It is therefore recommended for the production of varnish coatings to work according to the so-called active primer method where the coating mass is applied to a peroxide-containing layer previously applied to the substrate.

It is particularly advantageous to use the benzoins to be used according to the invention for those coating masses to which paraffin or wax or wax-like substances have been added, which float when the polymerisation starts and prevent the inhibiting effect of atmospheric oxygen.

For the protection of substrates which are sensitive to light, for example, light-coloured woods, small amounts of conventional UV-absorbs may be added to the moulding and coating masses without substantially impairing the reactivity. Furthermore, small amounts of conventional carriers and fillers as well as thixotropy agents, such as glass fibres, synthetic fibres, silicic acid and talc, may be present during the photopolymerisation.

As radiation source for carrying out the photo-polymerisation, there may be used natural sun light or artificial radiators the emission of which lies in the range from 250–500 μ, preferably 300–400 μ. Mercury vapour, xenone and tungsten lamps are suitable, for example. Even under the ultraviolet and visible radiation of fluorescent lamps which are poor in energy and have an emission of 300 – 580 μ, the masses according to the invention rapidly harden to give almost colourless mouldings and coatings.

In the production of mouldings from masses sensitized according to the invention, it is particularly advantageous that the masses can be cured by appropriately dosed irradiation without appreciable heat effect; even fairly large mouldings can thus be obtained free from cracks. In the absence of peroxides and metal accelerators, the curing may be also interrupted by darkening and completed at any time after storage of the prepolymers so obtained.

EXAMPLE 1

An unsaturated polyester prepared by condensation of 152 parts by weight maleic acid anhydride, 141 parts by weight phthalic acid anhydride, and 195 parts by weight propanediol-1,2 is mixed with 0.045 parts hydroquinone and dissolved in styrene to give a concentration of 65 per cent by weight.

Portions of 100 parts by weight of this resin supply form are admixed with 2 parts by weight of known photosensitizers, on the one hand, and of photosensitizers according to the invention, on the other hand, and the mixtures are stored at 60° C with the exclusion of light until gelling occurs. Table 1 contains the sensitizers and the values for storage stability at 60° C.

TABLE 1

Stability in dark storage of the supply form of a typical polyester resin with an addition of 2 parts by weight of sensitizer.

| Sensitizer | Storage stability at 60°C |
| --- | --- |
| benzoin | less than 1 day |
| benzoin ethyl ether | less than 1 day |
| $\alpha$-hydroxymethyl-benzoin | 7–8 days |
| $\alpha$-hydroxymethyl-4,4'-dichlorobenzoin | more than 10 days |
| $\alpha$-hydroxymethyl-4,4'-dimethoxy-benzoin | 6–7 days |
| $\alpha$-acetoxymethyl-benzoin | more than 10 days |

EXAMPLE 2

Portions of 100 parts by weight of the resin supply form described in Example 1 are admixed with 20 parts by weight styrene, 1 part by weight of a 10 per cent by weight solution of paraffin (m.p. 52°–53° C) in toluene, and with equimolar amounts of known photosensitizers, on the one hand, and of photosensitizers according to the invention, on the other hand. The solutions so obtained are applied to glass plates with the aid of a film extruder (500 $\mu$) and illuminated with the radiation of a fluorescent lamp (Osram-L 40 W/70-1) from a distance of 5 cm.

Table 2 contains the paraffin floating times and the periods of time until pencil hardness > 6 H is attained.

TABLE 2

| Sensitizer | Additive as parts by weight, referred to resin supply form | Floating time of paraffin after min. | Pencil hardness >6 H after min. |
| --- | --- | --- | --- |
| benzoin | 2.12 | 2.5 | 14.0 |
| $\alpha$-methyl-benzoin | 2.26 | 1.5 | 12.5 |
| $\alpha$-phenyl-benzoin | 2.88 | 1.3 | 13.5 |
| benzoin ethyl ether | 2.40 | 0.63 | 5.5 |
| $\alpha$-hydroxymethyl-benzoin | 2.42 | 0.80 | 6.0 |
| $\alpha$-hydroxymethyl-4,4'-dichlorobenzoin | 3.11 | 0.95 | 6.0 |
| $\alpha$-acetoxymethyl-benzoin | 2.71 | 1.0 | 7.5 |

EXAMPLE 3

A mixture of 100 parts by weight of the resin supply form described in Example 1, 20 parts by weight styrene, and 1 part by weight of a 10 percent by weight solution of paraffin (m.p. 52°–53° C) in toluene is admixed with 2 parts by weight $\alpha$-hydroxymethyl-benzoin and, in addition, with a peroxide or a metal compound, or with both, or with a UV-absorber, or with a peroxide and a UV-absorber. These solutions are applied with a film extruder to glass plates in layers of 500 $\mu$ thickness and exposed at a distance of 5 cm to the radiation of the fluorescent lamp described above. Table 3 contains the paraffin floating times and the periods of time until pencil hardness > 6 H is attained.

TABLE 3

| Additive referred to resin supply form percent by weight | Floating time of paraffin after min. | Pencil hardness >6 H after min. |
| --- | --- | --- |
| 4 cyclohexanone peroxide (50% in plasticiser) | 1.4 | 8 |
| 4 methyl ethyl ketone peroxide (40% in plasticiser) | 1.3 | 9 |
| 2 cobalt naphthenate solution (20% in toluene) | 1.2 | 8 |
| 4 methyl ethyl ketone peroxide (40% in plasticiser) 2 cobalt naphthenate solution (20% in toluene) | 1.9 | 13.5 |
| 0.05 $\alpha$-cyano-$\beta$-(4-methoxyphenyl)-methacrylic acid butyl ester | 3.0 | 14 |
| 4-methyl ethyl ketone peroxide (40% in plasticiser) 0.25 2-hydroxy-4-methoxybenzophenone | 1.7 | 14 |

EXAMPLE 4

An active primer prepared from a solution of 50 g of a nitrocellulose solution (20 per cent by weight in ethyl acetate), 18 g butyl acetate, 20 g methyl ethyl ketone peroxide (40 percent by weight in plasticiser), and ethyl acetate to make up 100 ml, is applied to wood in a layer of 100 $\mu$ thickness. After evaporation of the solvent, there are applied layers of 500 $\mu$ thickness of (a) a polyester resin mixture consisting of 100 parts by weight of a resin supply form as described in Example 1, 20 parts by weight styrene, 1 part by weight of a 10 percent by weight solution of paraffin (m.p. 52°–53 C) in toluene, 2 parts by weight $\alpha$-hydroxymethyl-benzoin; and (b) a polyester resin mixture according to (a) to which 2 parts by weight of a cobalt naphthenate solution have been added; and (c) a polyester resin mixture according to (a) to which 2 parts by weight cobalt naphthenate and 0.1 part by weight of a UV absorber have been added, and the layers are irradiated, after 3 minutes' ventilation, with the fluorescent lamp described above from a distance of 5 cm. Table 4 contains the description of the additives and the results of the polymerisation.

TABLE 4

| Additive referred to resin supply form percent by weight | Floating time of paraffin after min. | Pencil hardness >6 H after min. |
| --- | --- | --- |
| a. without additive | 1.4 | 10.5 |
| b. 2 cobalt naphthenate solution (20% in toluene) | 2.3 | 13 |
| c. 2 cobalt naphthenate solution (20% in toluene) 0.1 $\alpha$-cyano-$\beta$-(4-methoxy phenyl)-methacrylic acid butyl ester | 4.2 | 15.5 |

EXAMPLE 5

An unsaturated polyester prepared by condensation of 1765 parts by weight maleic acid anhydride, 756 parts by weight ethylene glycol, 405 parts by weight butane-diol-1,3, and 1540 parts by weight trimethylol-propane diallyl ether in the presence of 0.83 parts by weight hydroquinone is dissolved in styrene to give a concentration of 70 per cent by weight.

Portions of 100 parts by weight of this supply form are admixed, after the addition of 1 part by weight of a cobalt naphthenate solution (20 percent by weight in toluene) with various sensitizers according to the invention.

The solutions are applied to glass in layers of 500 $\mu$ thickness and illuminated from a distance of 5 cm with the fluorescent lamp described above until the film has gelled. The prepolymer is then illuminated by the radiation of a mercury vapour high pressure burner (Philips HPK 125 W/L) from a distance of 10 cm until the surface of the layers is tack-free. The pencil hardness then amounts to >6 H.

Table 5 contains the periods of time required for gelling under the fluorescent lamp and for curing.

TABLE 5

| Additive referred to resin supply form percent by weight | Gelling under fluorescent lamp after min. | Curing under Hg high pressure burner, pencil hardness >6 H after min. |
| --- | --- | --- |
| 2 α-hydroxymethyl benzoin | 0.8 | 6 |
| α-hydroxymethyl-4,4'-dichlorobenzoin | 0.8 | 6 |
| α-acetoxymethyl-benzoin | 1.0 | 6 |

EXAMPLE 6

10 g of freshly distilled acrylic acid methyl ester are mixed with 0.1 g α-hydroxymethyl-benzoin. Illumination is carried out from a distance of 10 cm with a mercury vapour high pressure burner (Philips HPK 125 W/L) through quartz on a water bath at 24° C. This solution of the sensitizer in the monomer is under a nitrogen atmosphere in a quartz glass the inner diameter of which amounts to 1.7 cm. The illumination time amounts to 2½ minutes. Immediately after illumination, the quartz glass is placed in a mixture of ice and sodium chloride in order to prevent heat polymerisation. The solution of the polymer in the monomer, including the proportion of solid polymer which is present on the inner side of the quartz (the side facing the mercury vapour high pressure burner), is rinsed with small amounts of a solvent (methylene chloride) into a small round flask. Any non-polymerised monomeric components and the solvent are then distilled off in a rotary evaporator. After drying the residue in a vacuum drying cabinet until the weight is constant at 60° C, the amount of polymer is determined. It amounts to 13.6 per cent by weight. If the sensitizer is not present, the amount of polymer is less than 0.1 percent by weight.

We claim:

1. A moulding and coating mass hardenable by UV-irradiation, said mass comprising a polymerizable compound or a mixture thereof containing an activated carbon-carbon double bond and an α-hydroxymethyl-substituted benzoin of the formula

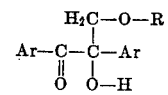

wherein Ar is phenyl or phenyl substituted by lower alkyl having from 1 to 4 carbon atoms, methoxy, ethoxy or halogen and R is hydrogen or acetyl.

2. The moulding and coating mass of claim 1 wherein said compound or mixture thereof containing an activated carbon—carbon double bond is a mixture of (a) an unsaturated polyester derived by condensing a dicarboxylic acid and a polyol and (b) a copolymerizable monomeric compound.

3. The moulding and coating mass of claim 1 wherein the compound of said formula is α-hydroxymethylbenzoin, α-hydroxymethyl-2,2'-dimethyl-benzoin, α-hydroxymethyl-4,4'-dichlorobenzoin, α-hydroxymethyl-4,4'-dimethoxy-benzoin or α-acetoxymethyl-benzoin.

4. The moulding and coating mass of claim 1 containing, in addition, a peroxide catalyst, a metal accelerator, a UV-absorber, a carrier, a filler or a thixotropy agent.

5. The moulding and coating mass of claim 1 which contains, in addition, a wax or wax-like substance.

6. The process which comprises irradiating the moulding and coating mass of claim 1 with ultraviolet light.

* * * * *